United States Patent [19]

Farrar et al.

[11] Patent Number: 4,832,158
[45] Date of Patent: May 23, 1989

[54] ELEVATOR SYSTEM HAVING MICROPROCESSOR-BASED DOOR OPERATOR

[75] Inventors: Dennis J. Farrar; Mark H. Duckworth, both of Memphis, Tenn.

[73] Assignee: Delaware Capital Formation, Inc., Wilmington, Del.

[21] Appl. No.: 129,331

[22] Filed: Dec. 3, 1987

Related U.S. Application Data

[63] Continuation of Ser. No. 5,414, Jan. 20, 1987.

[51] Int. Cl.⁴ .............................................. B66B 13/08
[52] U.S. Cl. .................................................... 187/103
[58] Field of Search ................................ 187/103, 108

[56] References Cited

U.S. PATENT DOCUMENTS

| | | | |
|---|---|---|---|
| 4,299,308 | 11/1981 | Shung et al. | 187/103 |
| 4,300,660 | 11/1981 | Schoenmann et al. | 187/103 |
| 4,300,663 | 11/1981 | Hmelousky et al. | 187/103 |
| 4,305,481 | 12/1981 | Hmelousky et al. | 187/103 |

Primary Examiner—William M. Shoop, Jr.
Assistant Examiner—W. E. Duncanson. Jr.
Attorney, Agent, or Firm—Brumbaugh, Graves, Donohue & Raymond

[57] ABSTRACT

An elevator system has a door operator with a door operator motor and a dedicated microprocessor for storing door open and door close cycles. The microprocessor initiates door open and close cycles responsive to external door open and door close commands. Preferably the microprocessor stores a plurality of door closed cycles in which the elevator controller selects one of the cycles when issuing a door closed command.

9 Claims, 13 Drawing Sheets

POWER CONTROLLER

ELEVATOR SYSTEM HAVING MICROPROCESSOR-BASED DOOR OPERATOR

This application is a continuation of application Ser. No. 005,414, filed on Jan. 20, 1987.

FIELD OF THE INVENTION The present invention relates to improvements in elevator systems and particularly to a microprocessor-based door operator system. The invention will be described as part of a novel hydraulic elevator control system, but is shall be understood that the door operator may be employed in other elevator systems.

BACKGROUND OF THE INVENTION

Hydraulic elevators include a hydraulic jack which is mounted in the hoistway pit and supports the elevator car. A pump unit supplies hydraulic fluid from a reservoir to the jack through a solenoid-operated valve that includes flow regulating pistons for selectively raising and lowering the car. The valve is, in turn, operated by a control system. The control system performs the functions of receiving hall calls and car calls, dispatching the car to the appropriate floors, stopping the car level with the floor landings, and opening and closing the doors. Part of the overall control system is a selector, which senses the position of the elevator car in the hoistway and determines slowdown and stopping points.

Traditionally, all of the control functions of a hydraulic elevator have been performed by relay circuitry centrally located in the machine room adjacent to the power unit. Car position signals are provided by switches mounted at appropriate locations in the hatchway. The switches are actuated by cams mounted on the car and the signals are brought to the controller by a hoistway riser.

A door operator mechanism is mounted on top of the elevator car. It includes a motor, pulleys and a linkage connected to the door, and cam-operated micro switches actuated at various points including the door open limit, door close limit, and door slowdown points. Switch signals are fed to the controller through wires from the hoistway. Thus, the controller is physically adjacent to some of the machinery it controls, but is remote from the door operator and to the external signals it requires.

Microprocessors possess a number of potential advantages over relay-based controls from the standpoint of system flexibility. It would be desirable, therefore, to replace the door operator relay controls in a hydraulic elevator with a microprocessor controller, provided that such a control could be employed with hydraulic elevator hardware in a cost effective manner.

As noted before, traditionally the controller and power unit are located in a machine room. The operating temperatures and vibrations of the power unit make the machine room a relatively inhospitable environment for delicate components such as microprocessors. It is not practical, then, to substitute a microprocessor control for relay circuitry without either taking special protective measures or utilizing components having higher specifications than that of typical industrial or consumer-grade components. This is undesirable from the standpoint of the higher costs involved.

Alternatively, as one manufacture has done, the microprocessor control may be relocated to another location such as on the car. However, the control circuitry in conventional hydraulic elevators is located in the machine room in order to be located close to the power unit, thereby minimizing the amount of power wiring. Relocating the control would require then additional wiring so that the microprocessor will still be able to communicate with the machinery and power supplies in the machine room and switches in the hoistway. To reduce installation cost and to improve reliability it is desirable to keep the amount of wiring to a minimum.

Each microprocessor has inherent limitations in terms of its input/output capabilities (number of I/O ports), processing capability, and speed. In any control system for an elevator, it is undesirable to have delays in processing and transmitting critical information, such as slowdown and stop signals, certain door control signals, and safety information. At the same time, it would be desirable from the standpoint of cost to minimize the number of dedicated terminals used by the central control for input/output with peripheral devices, to perform control functions using minimum microprocessor capability, and to perform critical decision-making functions with a minimum of delay.

SUMMARY OF THE INVENTION

The present invention is a microprocessor-based door operator which is particularly suited for an elevator system employing a distributed intelligence control system. By way of example, a hydraulic elevator including a control system is separated into four operating subsystems: a car logic controller ("CLC"), a selector, the door operator, and a power controller. The CLC, the door operator, and the selector are all mounted on the elevator car, and each is microprocessor-based. The power controller utilizes relays for certain control functions that are not incorporated in the CLC or other microprocessor based subsystems. The CLC is linked to the door operator and selector over a serial communications link, and utilizes a polled network protocol. The power controller is controlled by signals from the CLC and, in certain instances, from the selector.

In this illustrative system, each of the subsystems, including the door operator, carries out certain functions at the instruction of, but separate from the CLC. Accordingly, each of the subsystems carries out its intended functions independent of the limitations of the processing power and speed of the CLC microprocessor and independent of the speed of data transmission by way of the serial communications link. Communications between the four operating subsystems may be accomplished using a minimum of wiring and using microprocessor components matched to the processing capabilities of the particular subsystem. Each subsystem microprocessor is assigned a unique address, which makes it possible for any subsystem to communicate with any other subsystem.

Preferably, the communications link includes external access connectors for a portable terminal, to input data into the door operator and read data from the door operator.

In the exemplary system, the control functions are distributed among the subsystems. The CLC receives and latches hall calls and car calls, and sends enabling relay signals to the power controller to initiate elevator car runs and control slowdown. The CLC receives signals from the selector indicative of car position floor and slowdown points. The CLC also instructs the door operator as to when to begin a door open cycle, an also controls door open times.

The door operator includes a pair of microprocessors and performs all the control functions for the doors except for the decisions about when to open and close. The door operator controls opening speed and stopping of the door. It includes a standard operating cycle, in which it will reopen the door upon actuation of the door edge guard or light sensing device. It also includes other cycles of operation, in which the door will not completely reopen, or will ignore electric eye signals and attempt to close the doors at a reduced speed, i.e., "a nudging" operation. These operating cycles are programmed in the door operator microprocessor and the cycle selected for operation is determined by the CLC.

During door operating cycles, the door operator controller operates responsive directly to door edge and electric eye signals (or other obstruction detection devices), without going through the CLC, and therefore can respond instantaneously.

The CLC supervises and controls the other subsystems. But each of the other subsystem has preassigned decision making functions that are executed independent of the CLC. In view of the fact that the system includes a number of dedicated microprocessors, the critical control functions for elevator operation are not limited by the power capability of the CLC, or by the time limitations of serial communication between elements.

BRIEF DESCRIPTION OF THE DRAWINGS

FIG. 5d illustrates an exemplary operation of the control of FIG. 5a;

FIGS. 7a, 7b, 7c-1 and 7c-2 are schematic flow diagrams of the operation of the CLC, selector, and door operator in accordance with the invention.

DETAILED DESCRIPTION OF A PREFERRED EMBODIMENT

Figure 1:
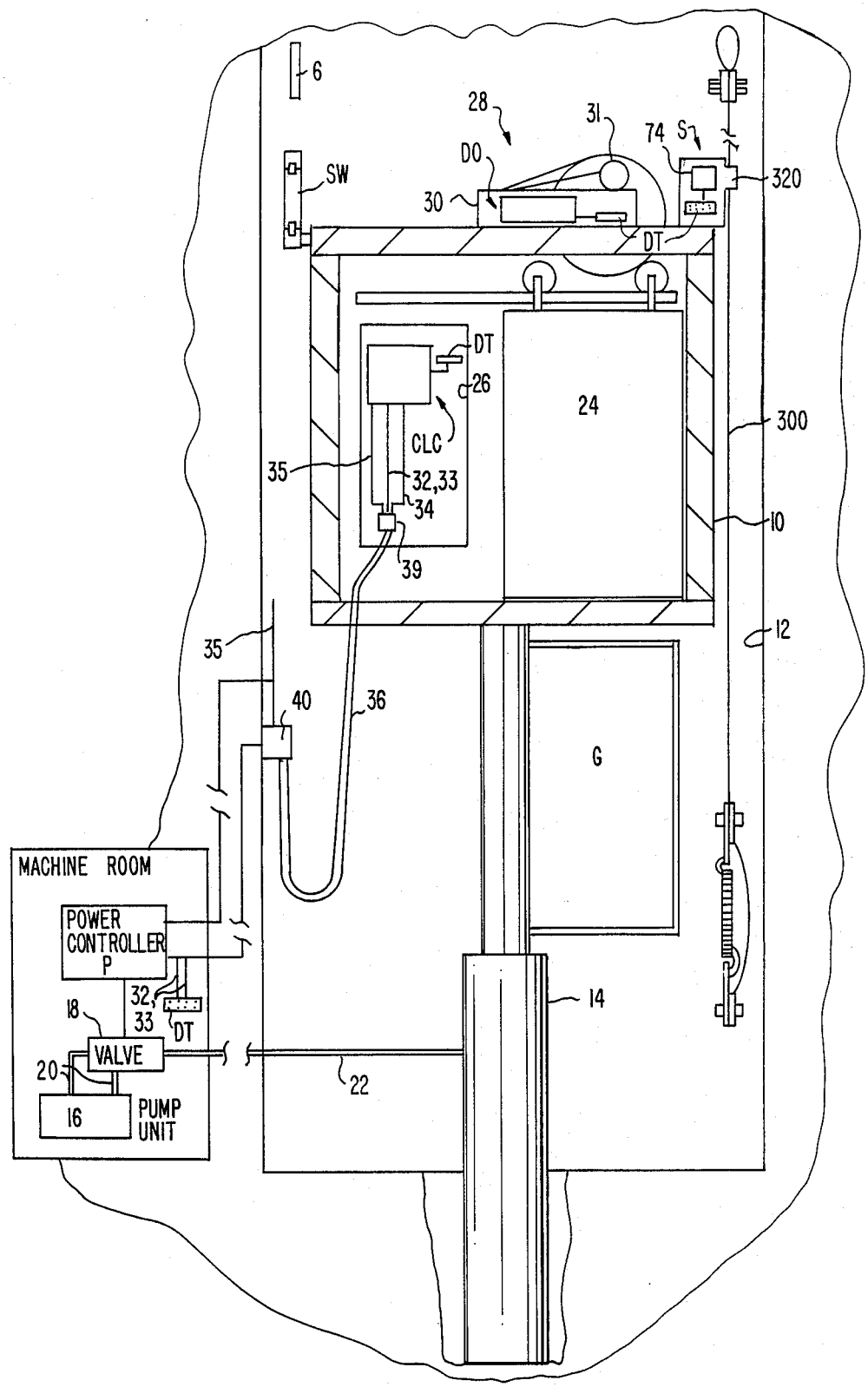
FIG. 1 is a front, schematic view of a hydraulic elevator system in accordance with the invention.

FIG. 1 shows a hydraulic elevator system that includes a car 10 vertically displaceable in a hoistway 12 between landings. One of the hoistway landing door is indicated at "G". The car 10 is raised and lowered by a hydraulic jack 14, which is supplied with hydraulic fluid from a pump unit 16 through a valve 18. An example of a preferred valve 18 is the I-2 or I-3 Oildraulic ® Controller manufactured by Dover Elevator Systems, Inc. The valve 18 includes solenoid-operated valves controlled by a power controller "P".

Oil is supplied from the pump unit 16 to the valve 18 through supply and return lines, indicated by 20, and from the valve 18 to the hydraulic jack 14 by a fluid line indicated by the numeral 22.

The car, shown schematically in FIG. 1, includes a door 24, a swing return panel 26, and a door operator mechanism 28, which includes a door operator housing 30 and motor 31. The motor 31 may be coupled to the door 24 using a conventional pulley and linkage arrangement, or in any other suitable manner. The coupling means, being well known, is only partially shown in FIG. 1.

Elevator operation is controlled by four interconnected subsystems: a car logic controller (referred to herein as "CLC"), which is mounted in the swing return panel 26; a door operator "DO" which is contained in the door operator housing 30; a selector "S", which includes a tape system 300 mounted in the hoistway and a sensor housing 320 mounted on the car, and which also includes a switch tree assembly "SW" mounted on the car and cams "C" mounted in the hoistway; and, finally, the power controller "P" mentioned above.

Figure 2:
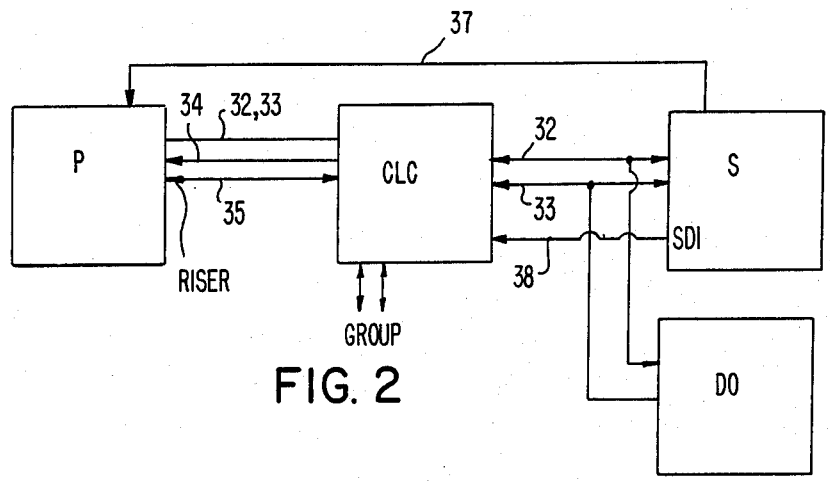
FIG. 2 is a schematic drawing of the control subsystems of the elevator according to FIG. 1.

The elevator system employs a distributed intelligence control, in which the CLC, door operator DO, and selector S have specific control responsibilities. Each includes a microprocessor for performing the designated functions of the subsystem, and also for communication with the other subsystems. The CLC, selector, and door operator microprocessors communicate over a pair of common communication lines 32, 33, as shown in FIG. 2, by way of a serial communications multi-drop link. As also indicated by FIG. 2 the selector "S" may communicate directly with the power controller "P" over communication line 37 as described further below. Finally, selector S communicates directly with an input of the CLC microprocessor over line 38 for providing a slowdown interrupt signal "SDI", also described further on.

An example of a suitable communications interface standard over links 32, 33 is RS485. Each of the microprocessor subsystems has an assigned address and employs suitable RS485 drivers and receivers for sending and receiving signals. The CLC acts as communications controller, and systematically polls the other devices, i.e. it sends out addressed communications and can receive responses within certain time windows. In this manner, other microprocessor subsystems, such as a rear door operator, may readily be connected into the system, requiring only the appropriate software. Also, a portable diagnostic terminal may be connected to the link, and the CLC polls for its presence. As indicated in FIG. 2, the CLC also has serial output terminals for group operation.

Communication between different devices is accomplished over a twisted shielded pair of wires, preferably using a technique called differential communication, in which one signal is the complement of the other signal. In order for each device in the communication to know whom it is talking to, the door operator, selector, car logic controller, and external terminal are each given an address.

Actual communication protocol is arranged in group call packets including a start flag, destination address, source address, type and length information and data field and finally a check sum. This multi-drop, differential RS485 system ensures reliable communication control.

Referring once again to FIG. 1, a diagnostic tool connector DT is provided physically adjacent to each of the subsystems CLC, DO, the power controller, and S. The connectors DT provide access to the communications link 32, 33 for an external plug-in device, i.e. a terminal of the type shown in FIG. 8. Standard multi-pin connectors and sockets may be used.

The CLC transmits control signals to the power controller P over a series of wires 34, and receives input signals from the hoistway riser over wires 35. The wires from the car are carried by a travelling cable 36. As indicated by FIG. 1, travelling cable 36 also carries the communications link 32, 33 to the area of the power controller P where it is connected to a diagnostic terminal connector DT. The travelling cable 36, carrying signal links 34 and 35 and communication wires 32, 33, is connected between a terminal 39 in the car and a junction box 40 mounted on the hoistway wall at about the mid-point of elevator travel. The travelling cable 36 also carries current from the power controller P to the car for power supplies associated with the microprocessors, the door operator motor 31, the lights and fan, push buttons, and so on.

Figure 3:
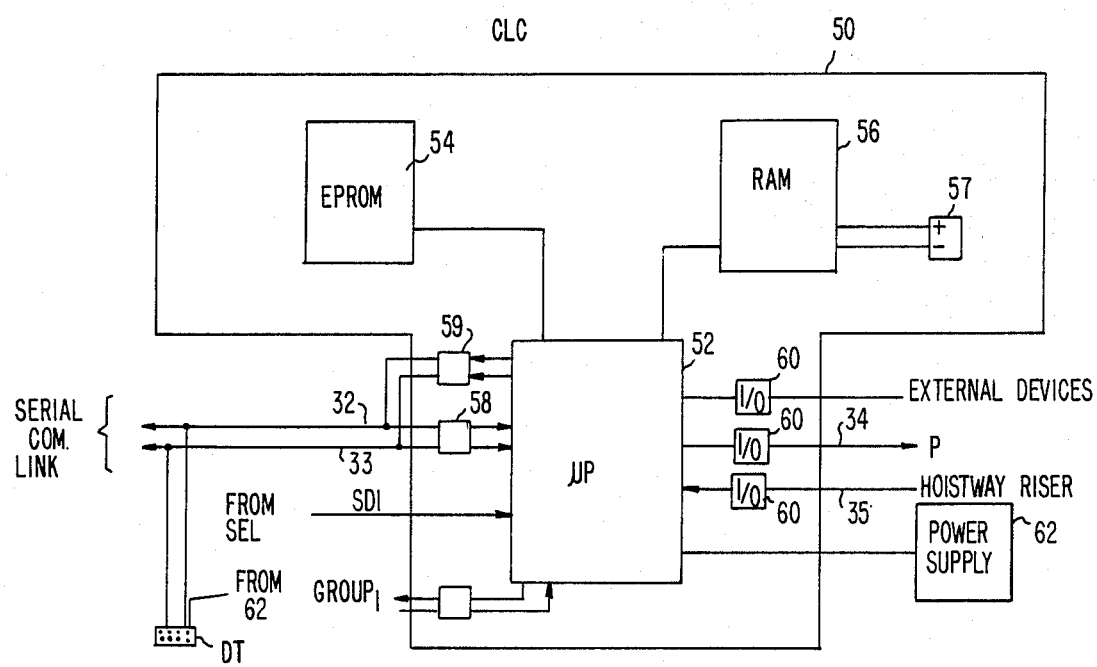
FIG. 3 is a schematic circuit diagram of the car logic controller (CLC)

FIG. 3 illustrates schematically the car logic controller or CLC. The CLC, which is physically located in the swing return 26 (FIG. 1), includes a printed circuit board 50 containing integrated circuits, including a microprocessor chip 52, an EPROM chip 54, memory chips, e.g. RAM 56, and serial interface devices indicated at 58, 59. An example of a suitable CLC microprocessor is a Motorola 6809. Preferably, if volatile chips such as RAM 56 are used for memory, a battery 57 is mounted on the board to retain memory in the event of a power failure or shutdown. The device 58, by way of example, is an RS485 type receiver for inputting signals into microprocessors 52, and device 59 is an RS485 type driver for outputting microprocessor communication signals to the serial communications link 32, 33.

The board 50 also incorporates devices 60, labelled I/O, necessary for the CLC microprocessor to communicate with external devices, such as car call buttons, car signal fixtures, call registered lights (hall lanterns), and hall call buttons (the latter being supplied over line 35 from the hoistway riser), and also to supply output signals over lines 34 to the power controller P. I/O interface devices 60, e.g. for converting voltages, are known.

A power supply 62, mounted in the swing return, supplies power to the CLC microprocessor and can also supply the door operator and selector microprocessors. The power supply 62 gets its power from the power controller over the travelling cable 36.

Figure 8:
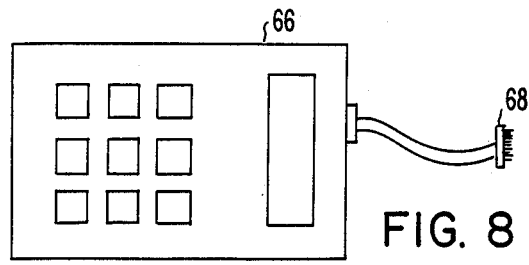
FIG. 8 illustrates a portable terminal for accessing the communications link.

The portable diagnostic terminal 66 shown in FIG. 8 plugs into any of the connectors DT through pin connector 68. If desired power can be supplied to the terminal 66 from one of the available power supplies, e.g. the power supply 62 or the power controller power supply (24 VDC), through one of the connector channels in connector DT, to obviate the need for an on-board power supply in the terminal 66. The device 66 is not required when the elevator is in normal operation and is unplugged. Since all of the connectors DT are connected to the common link 32, 33, the CLC, selector, and door operators all may be accessed from any of the locations.

Figure 3A:
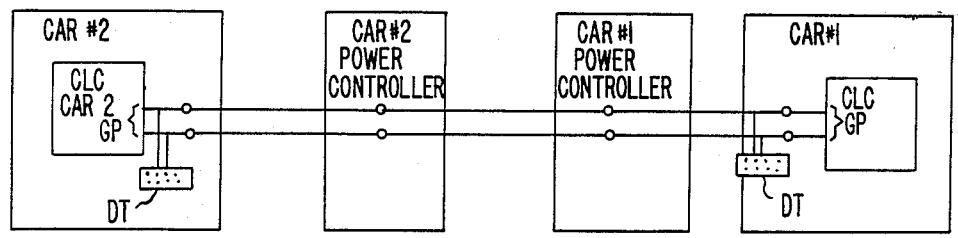
FIG. 3a is a schematic circuit diagram of a group operation in accordance with the invention.

Referring to FIG. 3a, the CLC in accordance with the invention includes a software section for group operation. In the event the car is to be operated in a group, the second car is connected into a pair of CLC I/O terminals assigned to group operation, preferably by connections made between the power controllers of the two cars as shown in FIG. 3a. Communication between cars is preferably via a serial communications link using communications protocol similar to that used among the car microprocessors.

Any microprocessor has a limited ability to address I/O. As will become apparent, in view of using serial communications protocol and in view of the distribution of control functions (and therefore distribution of control responsibilities of communicating with external devices), the control functions of the CLC utilize a relatively small number of I/O ports, and leave free terminals for performing other functions such as safety and fault monitoring. Distributed control with serial communications therefore reduces I/O cost and space requirements.

Figure 4:
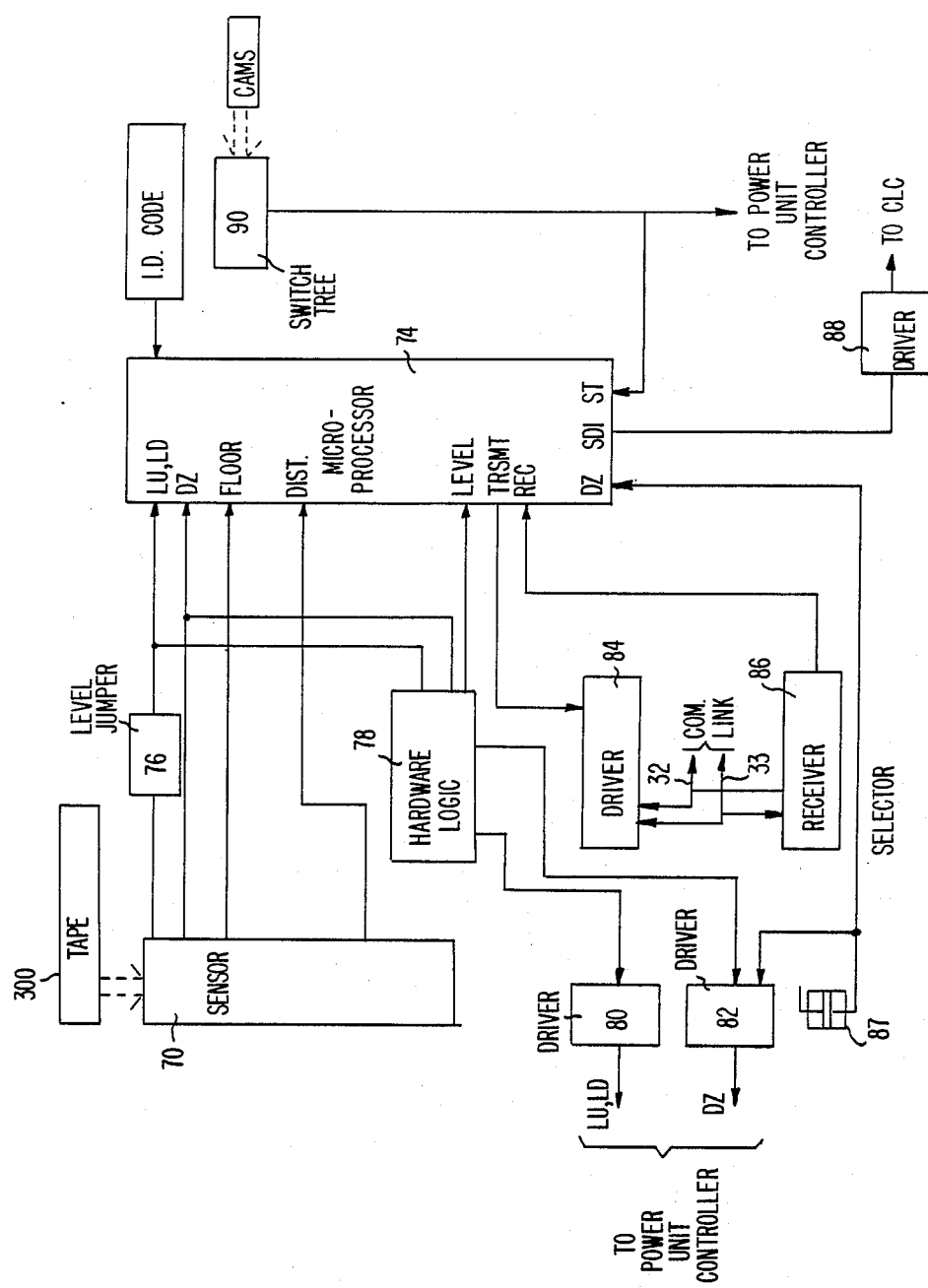
FIG. 4 is a schematic circuit diagram of the selector.

The selector S is illustrated schematically in FIGS. 1 and 4. The selector subsystem is a microprocessor-based control that provides signals for slowdown, levelling, and position. As indicated in FIG. 1, the selector subsystem includes three functional components: (1) the tape system (which comprises a stationary tape 300 and a sensor housing 320); (2) a switch device "SW" with cams "C", and (3) a processor board 74. An example of a microprocessor suitable for a use with a selector in accordance with the invention is the Motorola Model 68701, which includes on-board, programmable memory.

All of the selector active components are mounted on top of the elevator car, which reduces hoistway wiring associated with the selector function. The mechanical configuration of each of these components in described further on.

The tape system includes a sensor 70 that derives three sets of signals: levelling, floor position, and travel distance. More specifically, the sensor 70 derives the following signals from the tape 300: door zone DZ, indicating that the car is within a specified distance of the landing; level up LU, which indicates the car is in a region just below the landing; level down LD, which indicates the car is in a region just above the landing; floor identification, which may be read as binary code signals, and travel distance, which may be pulses representative of travel.

LU and LD sensors are activated when the car drifts a certain distance away from the landing. The distance the car is permitted to drift without activating the LU and LD sensors is called the dead zone. Preferably, a plurality of level up LU and level down LD sensors are provided at different spacings and a pair of LU and LD sensors are selected dependent upon the desired lead zone. A levelling jumper selector 76 may be used to select which pair of sensors are to provide the LU and LD signals.

DZ, LU, LD, floor position, and travel pulse signals are fed as inputs to the microprocessor 74. The door zone DZ, level up LU, and level down LD signals are also provided through a hardware logic device 78 t a pair of drivers 80, 82 which transmit such signals to the power unit controller P. The hardware logic device 78 decodes the levelling and door zone signals to produce a level signal to the microprocessor when the car is level. The device 78 buffers these signals for the drives 80 and 82.

Signals from the CLC are received in an RS485 receiver 66 over communications link 32, 33, and provided to an input terminal of the microprocessor 74. A microprocessor output terminal is connected to the output driver 84 for providing output to the communications link 32, 33.

The selector hardware also includes a Reed switch 87, which provides a door zone signal. The Reed switch 87 signals are provided to a microprocessor input, and also to the driver 82 for transmission to the power unit controller. The Reed switch signal is a duplicate of the door zone signal DZ received from the sensor 70 and is used as a backup.

Another output of the selector microprocessor 74 provides an output signal "SDI" for slowdown interrupt. This signal, which represents the slowdown point for the elevator car during a run, is provided to a driver 88 which transmits the signal to an input of the CLC.

The switch assembly 90 includes a plurality of switches, which are actuated by cams mounted in the hoistway indicating that the car is near the top or bottom of the hoistway. A first switch (terminal slowdown) activates at slightly less (1-2 inches) than the slowdown distance from the terminal floor. A second switch (directional limit) activates about 1-2 inches beyond the terminal floor. The switch assembly output signals are provided as an input to the microprocessor 74, and also routed to the power controller P.

The selector of FIG. 4 includes appropriate circuit protection devices, as well as devices for converting voltages, etc. which are known components and have been omitted for clarity. Also, as indicated on FIG. 4, the processor 74 includes an input terminal for providing an identification code, which is used to assign an address to the microprocessor for communicating over the communications link 32, 33.

Figure 5:
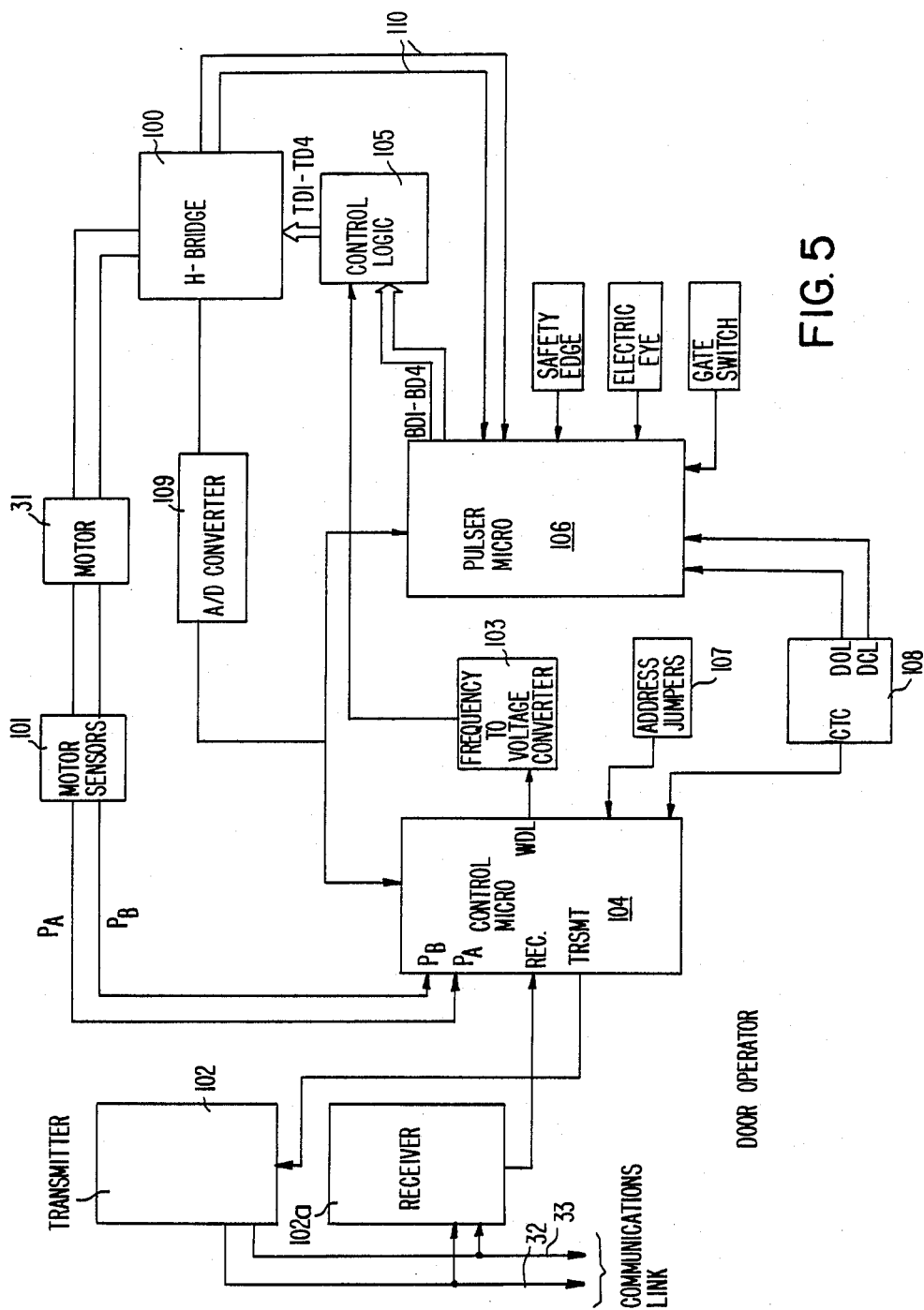
FIG. 5 is a schematic circuit diagram of the door operator.

FIG. 5 is a schematic circuit diagram of the door operator, which includes a door operator motor 31 as shown in FIG. 1. The motor is controlled by an H-bridge control 100, which includes diagonal pairs of transistors that are turned on and off selectively, depending upon the desired output voltage and direction of rotation.

Figure 5B:
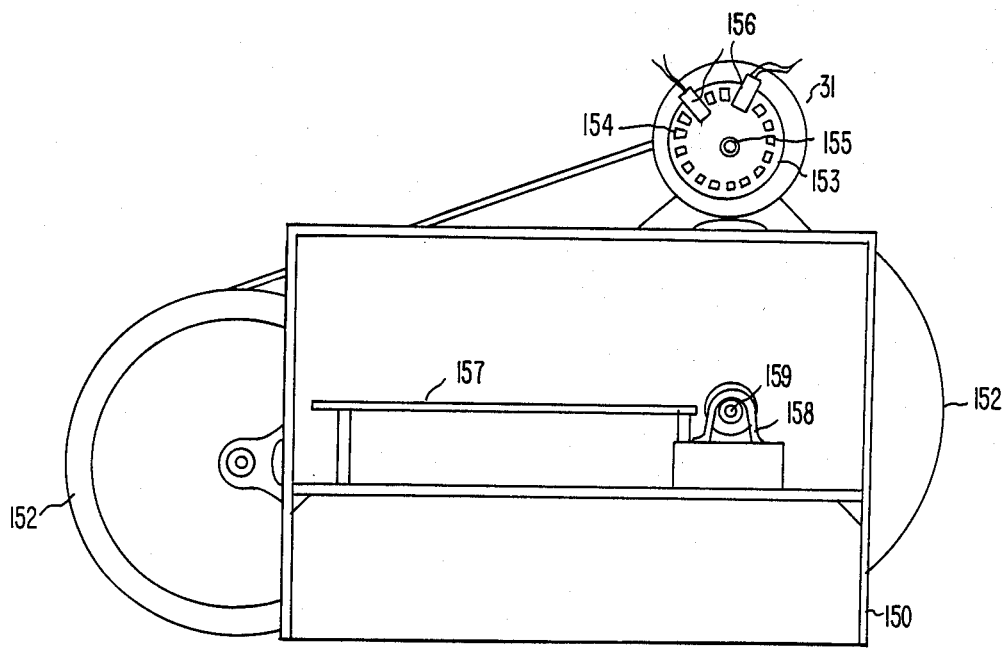
FIG. 5b is a side view of a door operator housing.
Figure 5A:
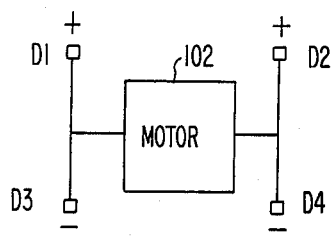
FIG. 5a is a schematic drawing of an H-bridge door motor control.

FIG. 5a illustrates a suitable H-bridge arrangement, containing transistors D1 through D4. By turning on a diagonal pair of transistors, e.g. D1 and D4, current flows through the motor armature. By turning on the other pair of transistors, i.e. D2 and D3, current flows through the armature in the opposite direction.

The door operator includes a pair of microprocessors, control microprocessor 104 and pulser microprocessor 106. An example of suitable microprocessors, that may be used both for the pulser micro 106 and control micro 104, are a pair of Motorola Model 68701 microprocessors. This microprocessor includes on-board, programmable memory. In view of the limited control responsibilities of the two microprocessors 104, 106, the respective control programs can be contained in such on-board programmable memory. The control microprocessor 104 communicates with the CLC through an RS485 driver 102 and receiver 102a, that are connected to serial link 32, 33. A communications address is assigned to the microprocessor using address jumpers 107.

Pulser microprocessor 106 includes outputs for supplying control signals BD1 through BD4 to a control logic device 105. Control microprocessor 104 also has an output connected, through a frequency-to-voltage converter 103, to control logic device 105. The control logic device buffers the signals BD1-BD4 to the H-bridge 100 and will inhibit them if the voltage from the converter 103 is too low, low voltages being indicative of improper operation of the microprocessor.

Control microprocessor 104 monitors for proper operation of the pulser micro 106 through communications over an 8 bit parallel bus that connects the two micros and an analog-to-digital converter 109. The control logic output WDL from control micro 104 is a constant frequency square wave signal that indicates proper operation of the two microprocessors. The square wave signal is applied to a frequency-to-voltage converter 103 to change it into a steady state active high logic signal. If the frequency from 104 is greater than a preset value, e.g. 400 hz, an active high signal, CONTROL, is applied to control logic device 105 to allow the signals BD1-BD4 to be passed through to the H-bridge control 100 as signals TD1-TD4. If the signal WDL stops switching or drops below the pre-set value, the signal CONTROL will go low and the bridge control signals BD1-BD4 will be removed from the H-bridge.

Any failure that allows the bridge control signals BD1-BD4 to stop switching properly and be applied to the bridge steady state will cause the door to move out of control. Having one micro monitor the other and using a square wave signal applied to a frequency to voltage converter provides for a fail safe watchdog circuit that will activate for either an active low or active high failure of the micro output.

Motor sensors 101 generate output pulses Pa and Pb, representative of rotational movement of motor 31, which are supplied to input terminals of the control microprocessor 104. Devices for generating output pulses responsive to motor rotation are known.

The analog-to-digital converter 109 is connected to a resistor, e.g. 3 ohms, in the H-bridge. All motor current passes through the current sense resistor. The a/d converter 109 converts this current, that represents torque applied to the door, into a digital number. This digital number is made available to both micros 104 and 106 through the 8 bit parallel bus. This current feedback is used to limit the maximum torque of the motor and hence force of the door as dictated by the elevator code. The value of closing torque may be preset in the microprocessor, using the diagnostic terminal 66.

A switch array 108, which is responsive to the movement of the car door, provides three signals: door open limit DOL, door closed limit DCL, and door center travel position CTC. DOL and DCL signals are provided to the pulser microprocessor 106. CTC signals are input to the control microprocessor 104.

The I/O section of the door operator pulser microprocessor 106 connects the logic section of the board to peripheral devices, which are the electric eye, safety edge and gate switch. The pulser microprocessor 106 can also monitor other signals representative of the operating condition of the door system circuitry such as monitoring the H-bridge status through feedback inputs 110.

FIG. 5b shows a door operator housing 150 supporting the door operator motor 31. Motor 31 drives a first pulley 151 that is interconnected with a main door pulley 152 coupled to open and close the door, in a known arrangement. A disc 153, containing slots 154 is attached to the motor shaft 155, and a pair of magnetic sensors 156 are positioned relative to the slots 154 to generate pulses representative of motor rotational displacement.

The housing 150 supports therein printed circuit board 157 containing the microprocessors 104, 106 and other circuit components for operating the motor 31. It also houses bearings 158 for supporting the shaft 159 of the main door pulley 152.

Figure 5D:
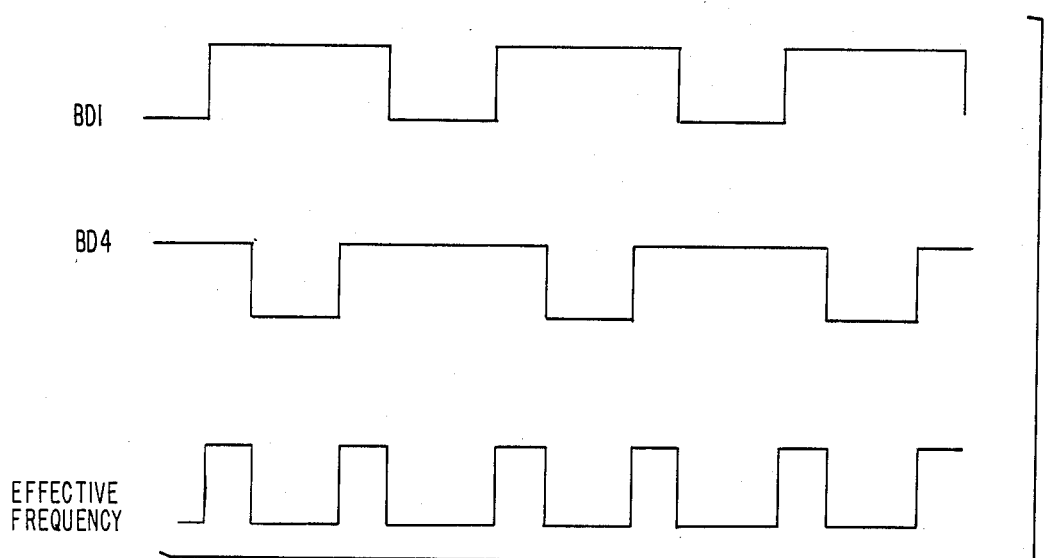
Figure 5C:
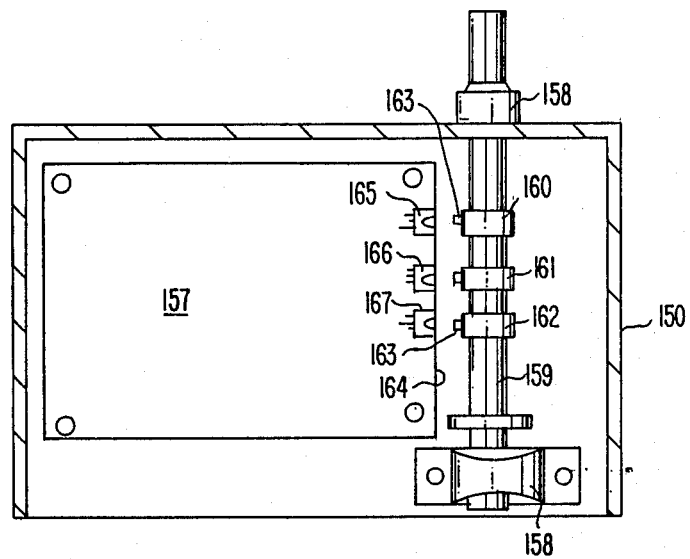
FIG. 5c is a top sectional view of a door operator housing.

As shown in FIG. 5c, which is a top sectional view of the housing 150, three bands 160, 161, 162, each holding a magnet 163, are mounted on a portion of the shaft 159 of the main door pulley disposed in the housing 150. The axis of shaft 159 lies in the plane of the printed circuit board 157, and one edge 164 of the printed circuit board extends parallel to the shaft 159. In addition to the other circuit components discussed above, three magnetic travel limit sensors 165, 166, 167 are mounted on the board 157 along edge 164, one sensor being mounted opposite each magnet holder 160, 161, 162. The angular position of band 160 is adjusted so that its corresponding magnet lies opposite to sensor 165 when the door is at the door open limit. Bands 162 and 161 are likewise adjusted so that their magnets lie opposite sensors 167 and 166 when the door is at the door closed limit and at approximate center travel, respectively. The output of each sensor is connected to a lead in the printed circuit board to provide the door open limit DOL, door closed limit DCL, and center travel CTC input signals respectively to the microprocessors 104, 106.

The sensors 165-167 as well as the sensors 156 used on the motor 31, may be magnetic flux sensors of known type.

Figure 6:
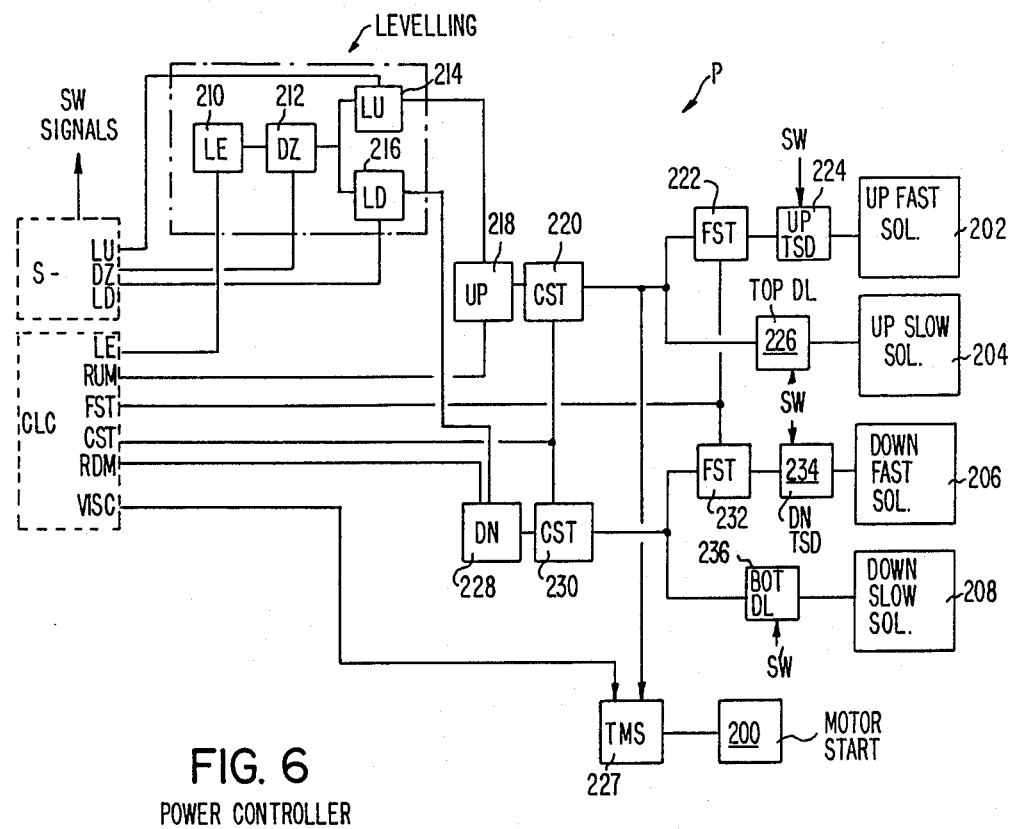
FIG. 6 is a schematic drawing of the power controller.

FIG. 6 illustrates schematically one example of a power controller P which, as shown in FIG. 1, is located in the machine room adjacent to the pump unit 16. The controller P contains relay logic circuitry for controlling, responsive to signals from the CLC, selector and safety circuit, the pump motor starter 200 and four solenoids contained in the hydraulic valve 18, that regulate the flow of hydraulic fluid to and from the jack: an "up fast" solenoid 202, and "up slow" solenoid 204, a "down fast" solenoid 206 and a "down slow" solenoid 208.

The power controller P is basically divided into levelling circuits and up and down run circuits. The levelling circuits include a level enabler LE relay 210, a door zone DZ relay 212, and level up LU and level down LD relays 214, 216. LE relay 210 is enabled by a level signal LE from the CLC. DZ, L and LD relays 212, 214, and 216 are enabled by LU, DZ, and LD signals from the selector.

The up run circuit includes an up relay 218, a normally closed car stop interrupt relay 220, a fast FST relay 222, an up terminal slowdown relay 224, a top directional limit TOP DL relay 226, and a TMS (timer-motor-starter) relay 227.

The down run circuit includes a down relay 228, a car stop CST relay 230, a fast FST relay 232, a down terminal slowdown DNTSD relay 234, a bottom directional limit BOT DL relay 236.

The CLC provides control signals run up RUM to enable the up relay 218, fast FST to enable the FST relays 222, 232, car stop CST to open the normally closed CST relays 220 and 230, and run down RDM to enable down relay 228. CLC also outputs a viscosity signal VISC to actuate TMS relay 227.

The power controller P will normally include interlock relay circuitry, made up of the hoistway door interlocks, and safety circuitry made up of the pit safety switch, top and bottom final limits, power unit stop switch and crosshead stop switch, that prevents the car from executing a run under certain conditions, e.g. when the doors are open. Such circuitry is used in known relay-based systems and is omitted from FIG. 6 for clarity.

As indicated in FIG. 6, signals from the switch assembly SW indicative of top directional limit, bottom directional limit, and up and down terminal slow down points are fed from the selector to an up terminal slow down relay 224, a top directional limit relay 226, a down terminal slowdown limit 234, and a bottom directional limit relay 236. Alternatively, signals from the switch assembly may be connected to switches in the power control circuit rather than relays, to act on the circuit directly.

SYSTEM OPERATION

CAR LOGIC CONTROLLER

The CLC acts as the central controller for the system. During all operations except levelling, the LE signal is off and the CLC controls the up and down run of the power controller.

Figure 7A:
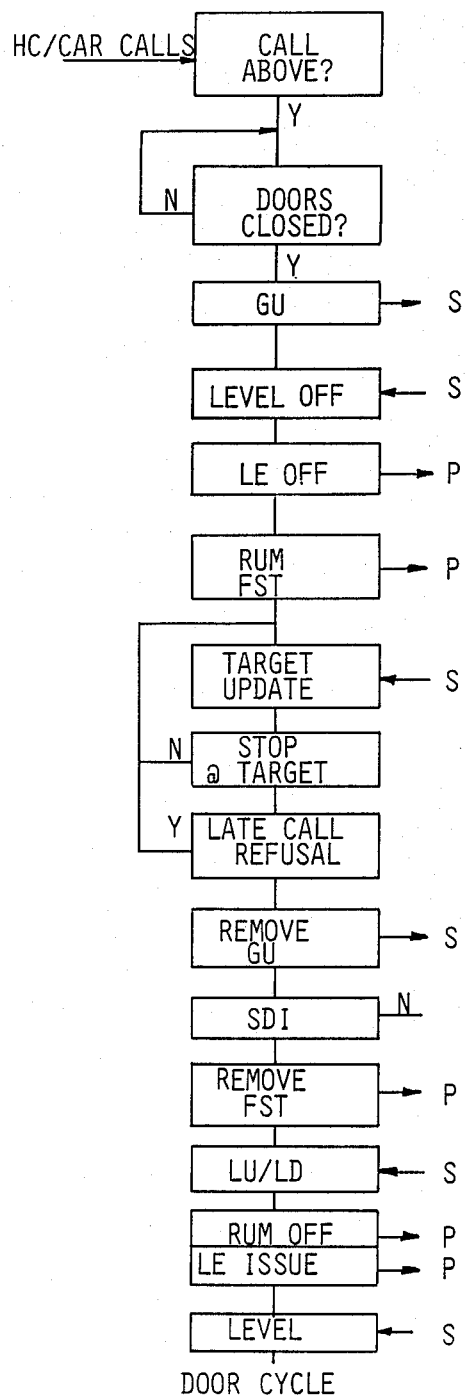

Referring to FIG. 7a, in operation of the elevator, hall calls and car calls are inputted into the CLC, which latches the call and provides an output to the call registered lights. If the doors are open, the CLC dispatches a close door signal to the door operator. Once the doors are closed, the CLC then issues a command to the selector to step up or down.

Once the step up/down signal is received by the selector, and the level command is removed, the door operator will lock the doors. The selector advances the target floor to the next floor and transmits the new target floor to the CLC. If a stop has been requested at the target floor, the CLC removes the run signal. If a stop signal has not been issued, the car continues to run, and the selector issues a late car refusal signal, at the last chance to stop, to the CLC. The selector then advances the target floor and the process is repeated.

If a stop has been requested at the target floor, the selector sends the interrupt signal SDI at the slowdown point to the CLC over a separate interrupt line. As noted above, the normal communication between microprocessors is by way of polled network. It takes on the order of 200 milliseconds to complete a poll. However, in the case of the stop signal, the CLC immediately removes the fast solenoid signal, disabling the FST relays 222, 232. As soon as the car actuates the level up indicator, the CLC relinquisher solenoid control to the hardware levelling circuits in the power controller, by removing the RUM signal and enabling the LE relay 210. Final levelling is then done by the power controller P and levelling sensors.

When the car is level, the selector S issues a level command to the CLC, and the CLC then permits the doors to open.

The CLC is programmed to retain in memory certain operating parameters of the elevator system such as door open times, automatic recall timeouts, fire service landings, etc. Preferably, the CLC, as well as the other controls subsystems, also monitor system operations through the I/O inputs and store elevator faults when detected. Providing external access, such as through input DT, permits faults to be read for troubleshooting purposes, and permits operating parameters to be set and modified externally.

During elevator setup and adjustment, certain parameters may be selected and input into the system for storage. Preferrably such parameters are stored in a battery-backed RAM 56 with the battery 57 mounted on the CLC board. When power fails, or is intentionally turned off, the elevator settings will be retained in the battery backed memory, and when power is restored, the microprocessor is programmed to look to this location for operating data. Factory default settings are stored in the EPROM 54, which settings also are used for initial elevator setup.

In order to require only one battery, all adjustable parameters are sent to the CLC to be saved. The CLC will upload the parameters on request of the door/selector via the 485 communications link.

Certain parameters have factory presets or defaults. On the first power up of the system, these parameters will have factory presets until changed. Also, if new adjustment values are destroyed for any reason, certain parameters will revert to factory presets.

SELECTOR

The selector microprocessor includes a program for retrieving floor height distances and slowdown distances stored in memory, setting target floors responsive to CLC commands and movement of the car, of determining car distance from the target floor landing, determining direction of elevator travel, and issuing slowdown and level signals to the CLC.

During elevator setup, the selector counts distance pulses between floors during an elevator run and stores floor height in memory. Also, the slowdown distance is input into memory through the portable diagnostic tool. Other parameters, such as number of floors, are also programmed into memory with the external diagnostic tool.

Figure 7B:
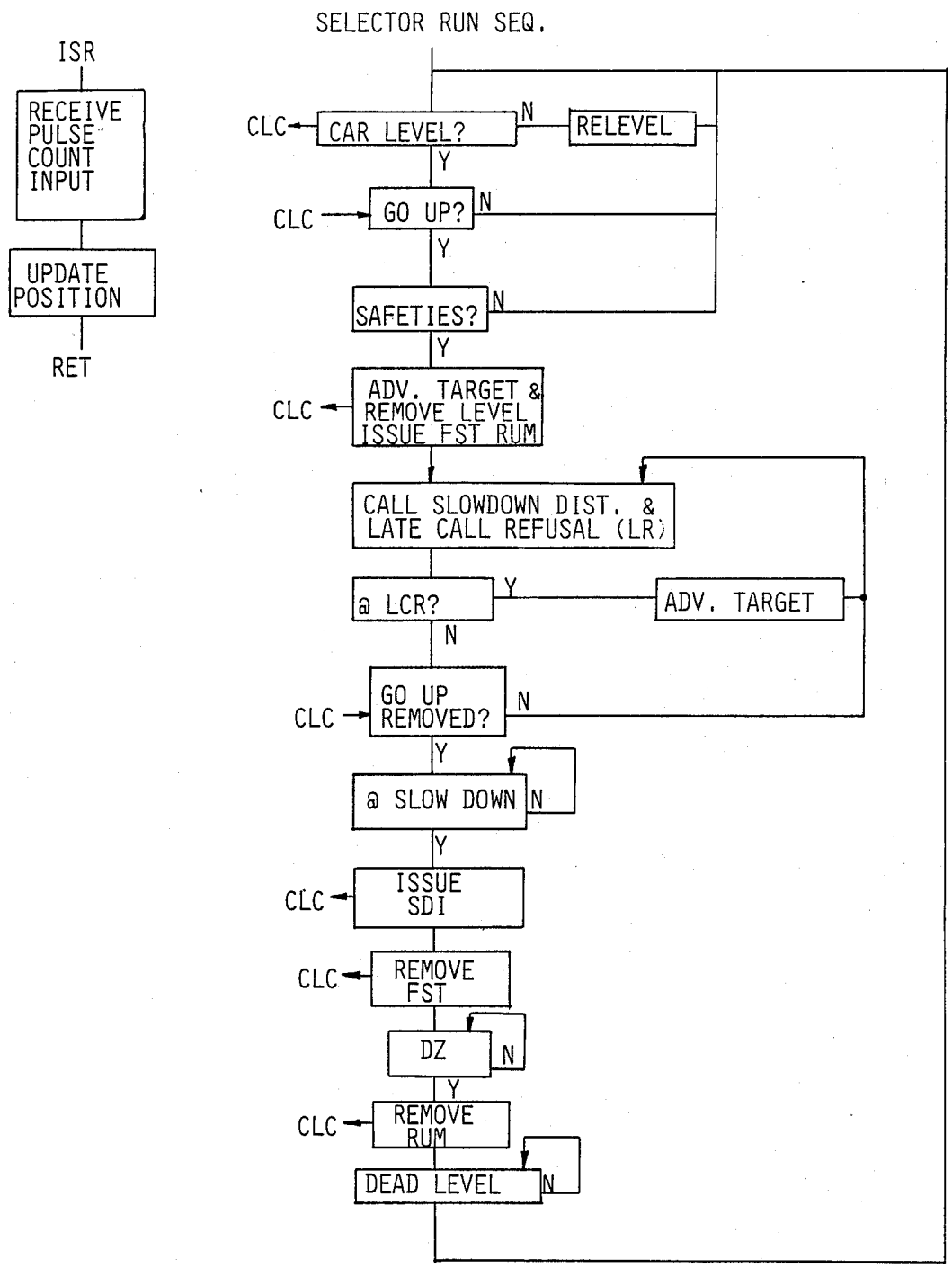

Referring to FIG. 7b, when stopped at floor, the target floor and the actual position are the same. The selector checks for level and, if the car is level, issues a level signal to the CLC. When the CLC receives a call, for example an up call, it issues a step up command to the selector for running up. When the selector receives this it checks the safeties. If the safeties are safe, it advances the target floor, removes the level signal and issues "fast" FST and "run up" RUM signals to the CLC. The selector also retrieves floor height distance from memory, to use as the initial target distance, and checks the preset slowdown distance and late call refusal, LCR distance. As the car moves up, the selector counts pulses to update target distance, and checks to determine if the car has reached the late call refusal, LCR distance. If it has reached LCR for the target floor, the selector advances the target floor to the next floor and calculates a new target distance, by adding the next floor height to the preset target distance. If it has not reached late call refusal, the selector checks the CLC to see if there is still a go up command. If the go up command has been removed (indicating a stop request at the target floor), the selector checks for the slowdown point for the floor. When the car reaches the slowdown distance, the selector issues the SDI slowdown command to the CLC and removes the FST command to the CLC. As the car continues to move toward the floor (i.e. slowing down), the selector checks for the door zone signal DZ. When DZ is reached, it removes the RUM to the CLC and waits for the car to level to dead level. At dead level, it issues the level signal to the CLC and the sequence starts over. The same sequence takes place for a down run except, the RUM becomes RDM and the "ups" become "downs".

During the above sequence, an ISR interrupt can request the processor to service the pulse count routine. This routine is very fast and the processor quickly returns to the above sequence.

The information for slowdown, levelling, and position is provided by a magnetic tape system. The safety and code compliances are provided by switches mounted on the car and actuated by rail-mounted cams at the terminal locations. The selector board monitors all of this and provides the appropriate signals to the power controller and the CLC.

Preferably, the selector is programmed to self-correct the set slowdown distance based upon prior elevator runs. By way of example, during elevator setup, preferably the installer sets a slowdown distance value so that the elevator neither overshoots nor undershoots the landing. At such time, the selector calculates the levelling time under the adjusted conditions. Thereafter, during elevator runs, should the levelling time increase or decrease, which is indicative of changes in viscosity in the hydraulic fluid, the selector automatically adjusts the slowdown distance to compensate for the difference in slowdown time.

Alternatively, the selector can determine the distance from the landing at which slowdown has been completed. In the case of overshoot, the selector can determine the distance from the landing at which the car has stopped. Should the car undershoot the landing, it will not stop, since the slow solenoid is still actuated, but will travel in at a minimum speed. The selector, since it calculates speed, determines the distance from the landing when the elevator reaches a predetermined minimum speed, and can make corrections based thereon.

DOOR OPERATOR

As noted before, motor current of the door operator motor 31 is regulated by an H-bridge transistor control. In driving the motor, transistor pairs are turned on and off to provide current to the door operator motor 31 as a square wave. The duty cycle of the square wave is increased or decreased to vary the voltage, and thus the speed of the motor. The pulser microprocessor 106 controls the operation of the motor 102, by controlling the duty cycle of the square wave sent by the control logic device 105 to the H-bridge transistors. As shown, pulser micro 106 outputs control signals BD1–BD4, which are converted by control logic device 105 to corresponding transistor control signals TD1–TD4. These signals, in turn, are used to turn on and off transistors D1–D4. The pulser microprocessor also watches for signals from the safety edge and electric eye.

The control micro 104 tells the pulser micro what speed the motor should output and which direction the motor should be going. Information is passed between two micro's via a bi-directional 8 bit BUS using a handshake protocol. The control micro also monitors the speed and current of the motor, adjusting the duty cycle when necessary. The control micro 104 uses RS-485 type communication protocol for transmitting and receiving signals from the CLC.

The H-bridge receives signals BD-1, BD-2, BD-3, and BD-4 from the pulser micro, which signals control the H-bridge. Examples of signals BD-1 and BD-4 are illustrated FIG. 5d. The effective frequency represents the switching frequency that the armature sees. Since both transistors BD-1 and BD-4 must be on for current to flow, the effective frequency is twice the frequency of either transistor. The bridge switching pattern is designed to allow each transistor to provide ½ the switching required. The combined on duty cycle applied to the motor is the result of the overlapping on periods of both transistors. Therefore the effective duty cycle applied to the motor is varied by varying the individual duty cycle of each transistor. Each transistor is turned on for a variable percentage of a cycle and then off for the remainder of the cycle. By operating the transistors out of phase and alternately, the effective switching frequency is twice the switching frequency of either transistor. This allows the transistors to switch more slowly, reducing switching losses in the transistors. Moreover, the effective frequency can be raised to above the limit of human hearing.

The pulser 106 micro receives 8 bit instructions from the control microprocessor 104 representative of the duty cycle required, and a voltage signal representative of motor direction.

When the pulser micro receives a new duty cycle value, it determines whether this duty cycle will be used to apply power to the door or to retard door movement (dynamic braking). The pulser micro retrieves from a duty cycle table delay times between transistor firing sequences for the selected duty cycle. Then, the pulser micro executes an appropriate power or retard loop routine to output the appropriate control signals BD1-4, for example as shown in FIG. 5d.

In operating the door, the pulser and control microprocessors obtain feedback relative to the door movement. The position of the door and door movement are provided from a motor sensor. The motor sensor includes a metal disk with holes and a pair of sensor units. Each of the sensor units includes a magnet and a magnetic flux sensor, positioned on opposite sides of the disk so that the sensor detects the holes. The disk is connected to the rotor shaft of the motor, so that the magnetic sensors provide output pulse signals representative of motor rotation.

Signals from the two sensors are 90 degrees out of phase. Through a technique called quadrature, as described further on in connection with the tape sensor system, the microprocessor can determine the direction of motor travel. Moreover, the microprocessor calculates the instantaneous speed of the motor based on the time between pulses, and conducts error checking through the two signals. This is done by the control micro 104.

During setup of the elevator the CLC commands the door operator to execute a set up cycle. At this command the door operator moves the door from the door open limit to the door close limit and counts the number of pulses from the motor sensor. Travel distance is stored in the CLC when the door is set up and sent to the door on request. The control micro uses the motor quadrature signal to track the distance travelled. The position indicator is stored in the car logic controller in battery backed RAM.

Figures 1, 7C:
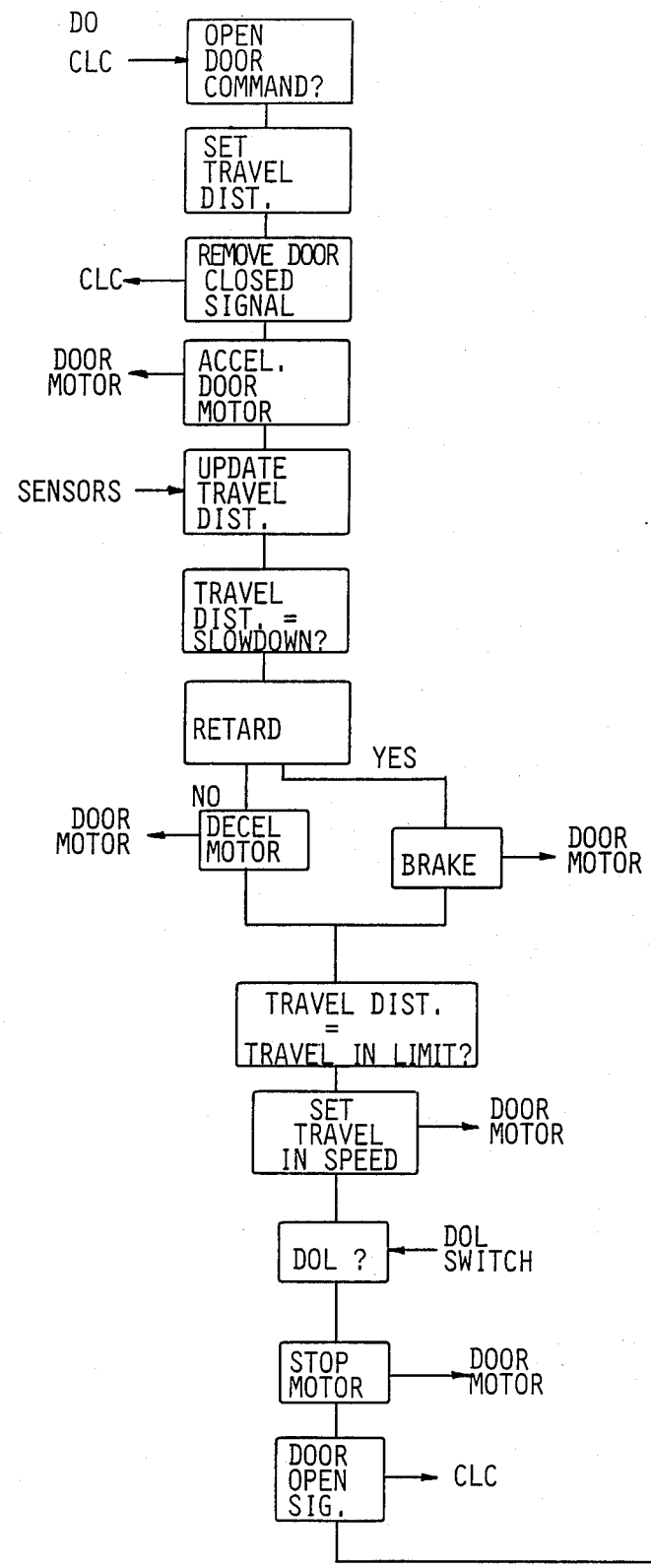
Figures 2, 7C:
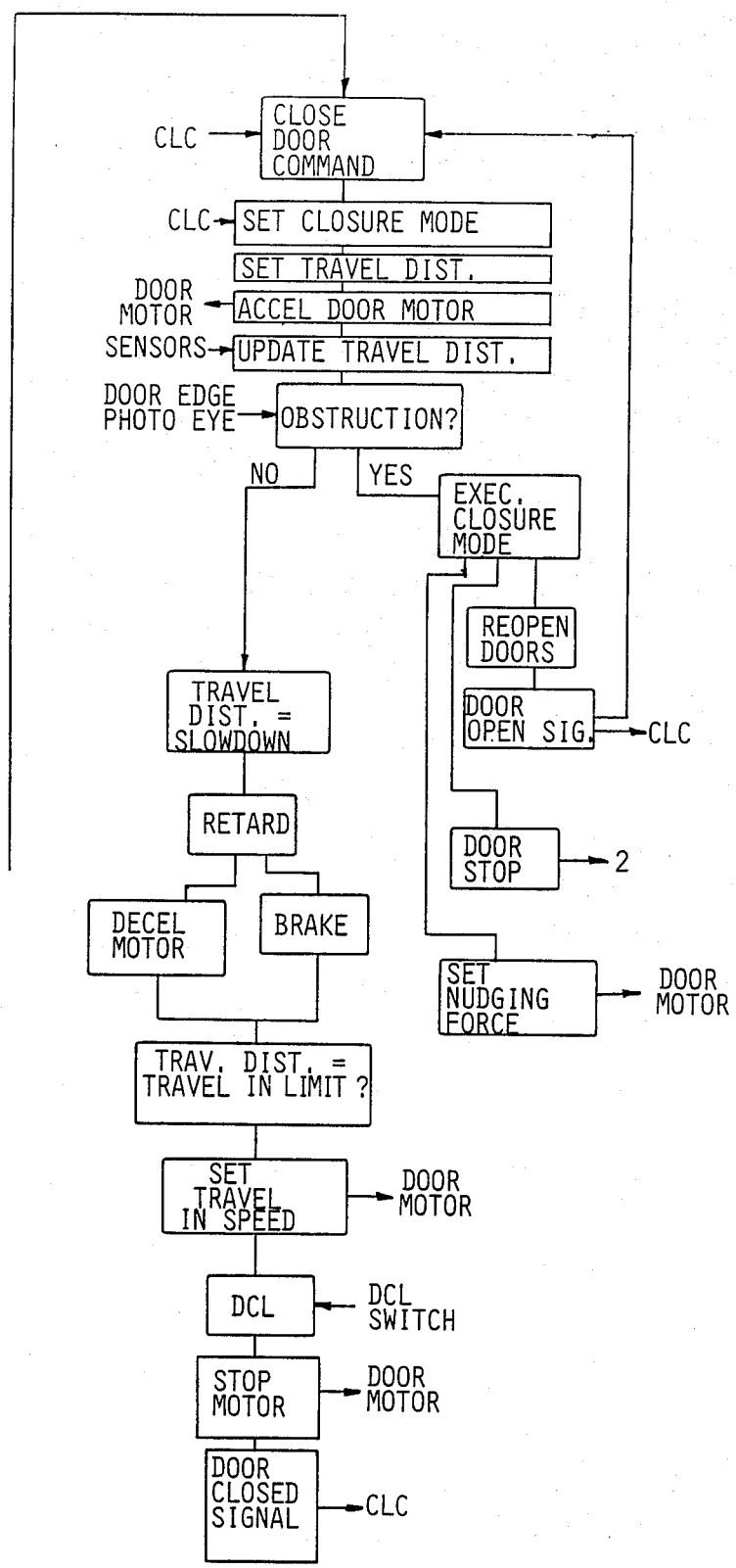

Operation of the door operator is as follows, with reference to FIG. 7c. Upon receiving a "door open" command from the CLC, the control micro 104 issues a command to the pulse micro 106 to initiate a door open cycle.

The pulser micro 106 outputs signals BD1–BD4 in the proper pattern for open and with the duty cycle to generate the speed dictated by the control micro 104. All speeds and positions are retained in the memory of control micro 104 and the CLC and are programmed during elevator setup with terminal 66.

The control micro 104 instructs the pulser micro 106 to begin ramping up door open speed at a controlled programmed rate until open high speed is reached. As the motor rotates, pulse signals PA & PB from motor sensor 101 are provided to control micro 104, which decrements the door travel distance, until it reaches the slowdown point. The control micro instructs the pulser micro 106 to begin ramping down the door open speed at a controlled rate until the door reaches a programmed "travel-in" point, whereafter the motor moves at a preset travel-in speed until reaching the door open limit. An alternate slowdown mode is available that applies reversing power (retard) on the motor until the speed is reduced to a preset manual speed at which time the door continues at manual speed until reaching the door open limit. Once the door open limit is reached, pulser 106 stops the motor.

The normal deceleration, as mentioned above, linearly decreases the speed from the slowdown point until the travel-in point. Then the door continues at manual speed.

The CLC determines the length of time the door will remain open, which is usually shorter for passengers leaving the car than when passengers are entering (i.e. shorter when the car is responding to a car call than a hall call). The CLC issues a "close door" command. It also instructs the door operator as to closure mode. The door closes according to the same algorithm above, except if one of the safeties is actuated. Should this occur, the pulser micro 106 reaction depends on the mode of operation. In normal mode the pulser immediately stops the motor and reopens the doors. In another mode, the pulser stops the motor but does not fully reopen the doors. In a third mode, the pulser ignores the photo-eye and closes the door under a specified amount of closing force, i.e. a "nudging" operation. In a fourth mode, if the door encounters an obstruction that prevents either complete opening or closing, without activation of the safety edge or photo eye, the door will open or close a specified number of times, after which the cycles will be at increased power. If the doors still do not shut, the car will shut down. In either event, the stopping mode is preselected by the CLC, and the closing cycle is executed independent of the CLC. The control micro signals the CLC when the doors are closed and the gate relay is activated.

POWER UNIT CONTROLLER

As discussed above, the power controller comprises relay circuitry which is under the control of the CLC, except during levelling operations and with the exception that certain safety devices can override the CLC control.

In order to make an up run, the CLC issues a run up command RUM, which actuates the up relay 218, and also issues a fast signal FST, to activate the FST relay 222. Under normal operations, the car stop signal CST is off, and therefore the CST relay 220 is closed. Also, under normal conditions, the up terminal slowdown switch and up top limit switches are closed, and therefore relays 224 and 226 are energized. As a result, the run up and fast signals from the CLC energize both the up fast solenoid 202 and the up slow solenoid 204, and the car begins a full speed run up. When the car reaches the slowdown point for landing, the CLC removes the fast signal, disabling the up fast solenoid 202, and the car begins to slow down. As the car approaches the floor, the selector door zone sensor is actuated by the door zone magnet, and the selector signals the CLC that the car is within levelling distance. Thereafter, the CLC issues the level LE signal, to actuate the LE relay 210, and removes the run up signal RUM. The up relay 218, however, remains energized, because both the level up LU and door zone DZ relays 212, 214 are actuated. As soon as the car is level, and the LU signal ceases, LU relay is deactivated, deactivating up relay 218 and stopping the car at the landing.

When the up relay 218 is activated, an output signal energizes TMS relay 227, starting the motor. The TMS functions to keep the pump motor operating slightly longer than the car is moving, which allows the car to make a valve-controlled stop and not a motor starter stop.

When the car is parked at a landing and level, the door zone relay remains energized. Should the car move more than a predetermined distance away from the landing, the selector will issue either a level up LU signal or level down LD signal, which will activate one of the relays 214 or 216, causing the car to level up or down.

In practice, in order to run up, in addition to the RUM signal from the CLC, the interlock relays, connected to hoistway doors and gate, must be energized in order to permit the car to move.

A viscosity signal from the microprocessor may also start the TMS timer and motor starter, in order to maintain a desired minimum oil temperature. In the past, it has been necessary to maintain the hydraulic oil within specified temperature limits to ensure accurate running of the elevator. In this operation oil circulates in a by-pass mode, being heated in the process. In an elevator system having a selector that corrects for changes in oil viscosity, it is not necessary to provide a viscosity signal for heating the oil, except in the case of extreme temperature variations, and a considerable amount of energy can be saved.

If a car is running up and opens the up terminal slow down, the up terminal slowdown switch will disable the up fast solenoid, permitting the car to run up only on the slow solenoid. If the car should thereafter move to the top directional limit, the top directional limit relay will disable the up slow solenoid preventing any further upward car movement. The up and down slow down switches, which are switches mounted on the car, slow down the stop the elevator near the top and bottom terminal landings independent of the selector function.

SELECTOR CONSTRUCTION

Figure 9:
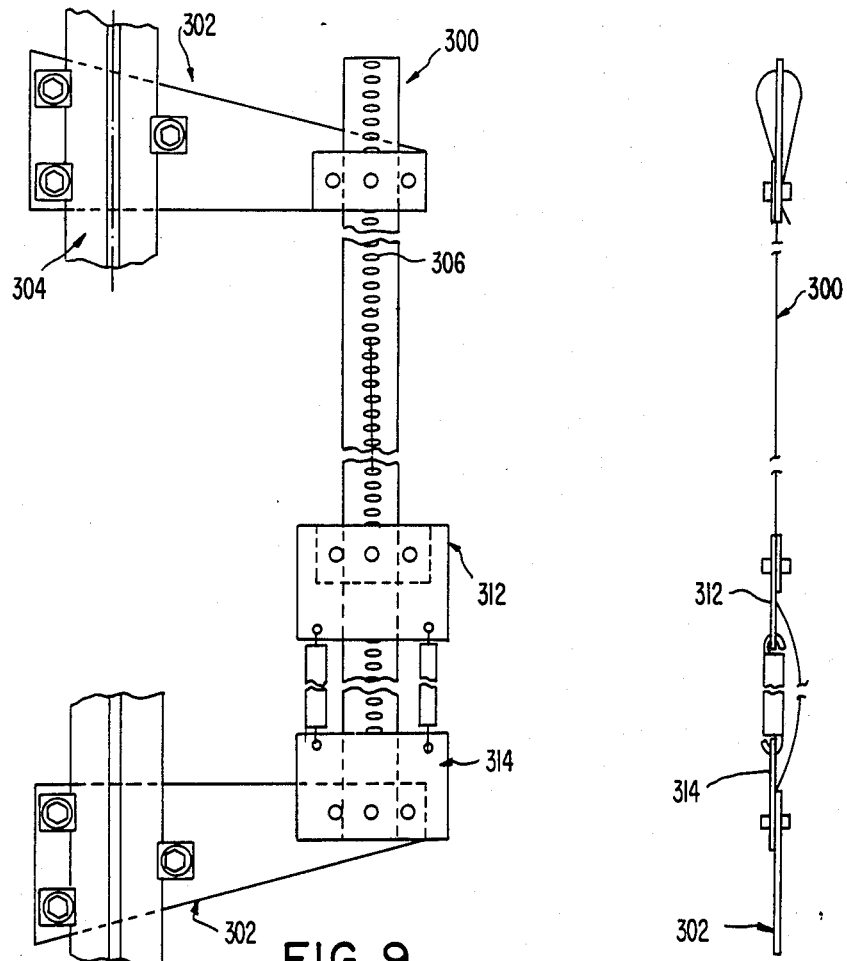
FIGS. 9 & 10 are front and side views of a selector tape in accordance with the invention.
Figure 10:
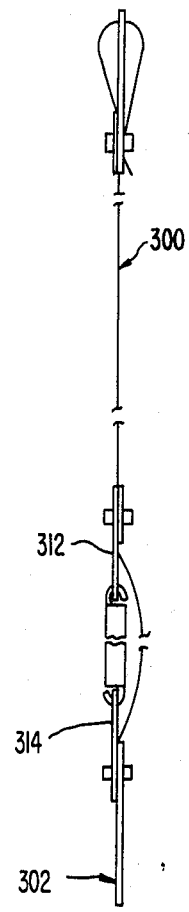
Figure 11:
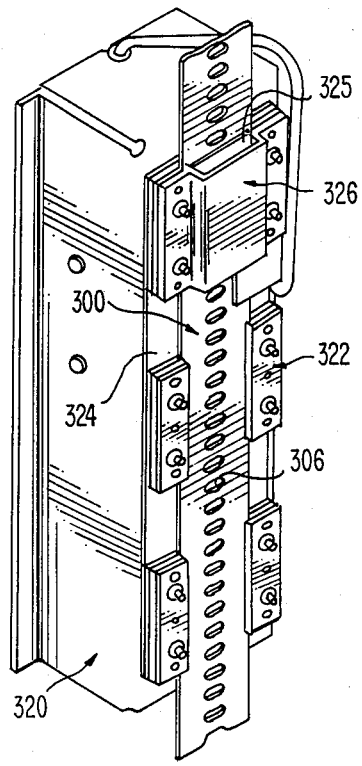
FIG. 11 is a perspective view of a selector housing and selector tape in accordance with the invention.
Figure 12:
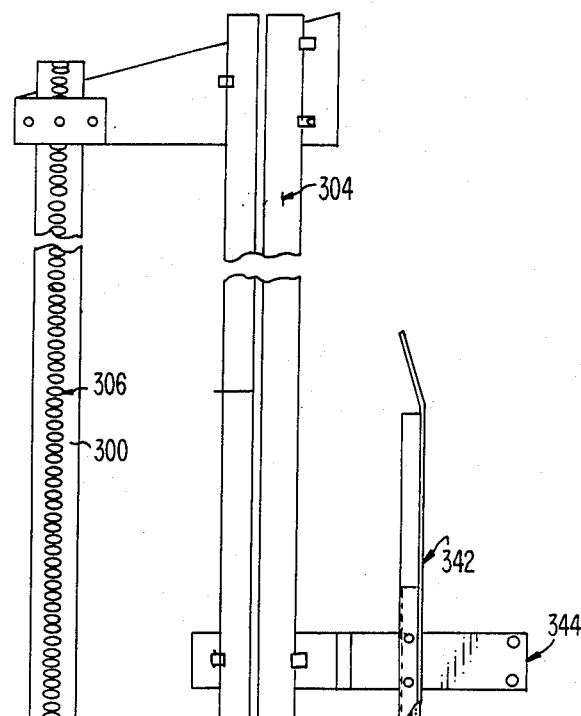
FIG. 12 is a front view of a portion of the elevator guide rail and selector tape together with the selector housing and switch assembly mounted on the car.
Figure 12:
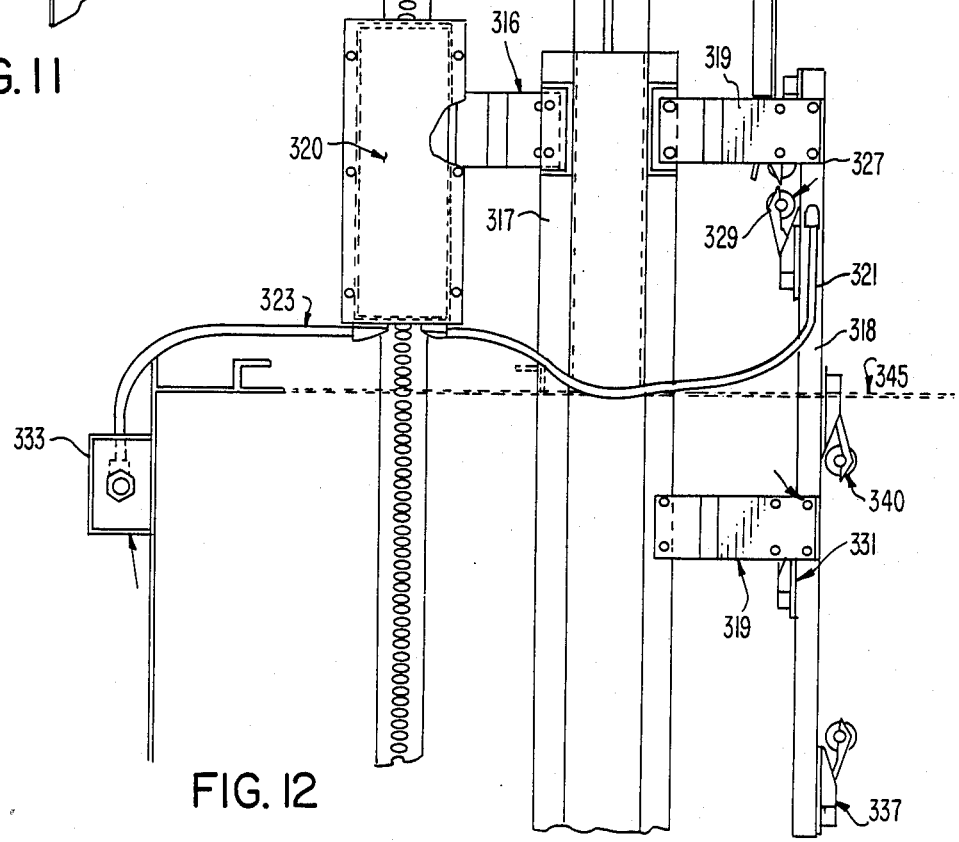
Figure 13:
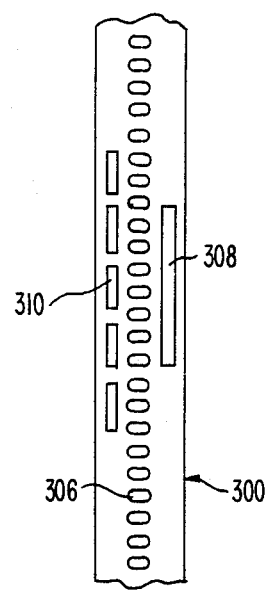
FIG. 13 is a front view of a section of the selector tape, showing an arrangement of magnets for indicating floor position and door zone.

FIGS. 9–16 illustrate a particularly advantageous form of a selector system for use in connection with a microprocessor-based elevator system. Further details of this construction are disclosed in commonly owned, co-pending U.S. patent application Ser. No. 005,554, now U.S. Pat. No. 4,798,267, entitled Elevator System Having An Improved Selector, the pertinent portions of which are incorporated by reference. Referring to FIGS. 9 and 10, a selector tape 300 is mounted vertically in the hoistway. As an example, the tape 300 may be mounted on brackets 302 attached to one of the elevator rails 304 at the top and bottom of the hoistway. Preferably, the tape is made of steel and is approximately 3 inches wide. The tape 300 includes a series of laterally elongated holes 306 spaced vertically along the hoistway. Referring to FIG. 13, two series of magnets 308 and 310 are strategically mounted on the sides of the holes 306. As described further on, magnet 308 provides a door zone and level indication at each floor, whereas magnets 310 provide a binary floor code. The right side is used for levelling; the left for absolute position (floor code); and the center for relative position. The slots are preferably punched into the tape in the center thereof.

The tape is preferably a hardened add tempered steel and supports the strip magnets which are glued thereon. It has been found that by using elongated slots, rather than round holes, the ability to accurately sense the holes, and provide quadrature (see FIG. 14, discussed infra) is greatly enhanced.

As shown in FIGS. 9 and 10, the bottom of tape 300 is bolted to a bracket 312, which is spring-connected to a second bracket 314. The second bracket 314 is then connected to the rail bracket 302. As can be seen in FIG. 10, the tape 300 is provided with slack between the brackets 312 and 314, to permit a limited amount of elongation of the spring in the event the tape binds and is pulled up.

FIG. 12 shows one particularly advantageous mounting for the selector system in accordance with the invention. The main selector housing 320 is connected by a bracket 322 to one of the elevator stiles 324. The switch assembly 326 is mounted by bracket 328 on the elevator stile 324. A first cable 321 connects the switch assembly to the main selector housing 320 and a second cable 330 connects the selector to a junction box 333, which in turn is connected to plug-in terminals on the CLC board.

The switch assembly 326 includes an up terminal slowdown switch 334, an emergency terminal speed limiting switch 334a, a top directional limit switch 336, a bottom terminal slowdown switch 338, and a bottom directional limit switch 340. FIG. 12 also illustrates the top directional limit cam 342, which is mounted by a bracket 344 to the elevator rail 304 in a manner so as to engage, sequentially, the up slowdown switches 334 and 334a and limit switch 336. A bottom limit cam of similar configuration is mounted at the bottom of the hoistway in such a manner as to engage switches 338 and 340. The top of the elevator car is indicated by 344. As can be seen in FIG. 12, when an elevator is travelling in the upward direction, up terminal slowdown switches 334 first encounter the cam 342. As described in connection with FIG. 6, the signals from the switches 334 and 334a are supplied to the power controller, and disable the up fast solenoid. Accordingly, the car can then thereafter move in an upward direction only under the power of the up slow solenoid. If the car continues to move in the upward direction, the terminal limit switch 336 engages the cam 342 which disables the up slow solenoid and prevents any further movement of the car in the upward direction.

Figure 15:
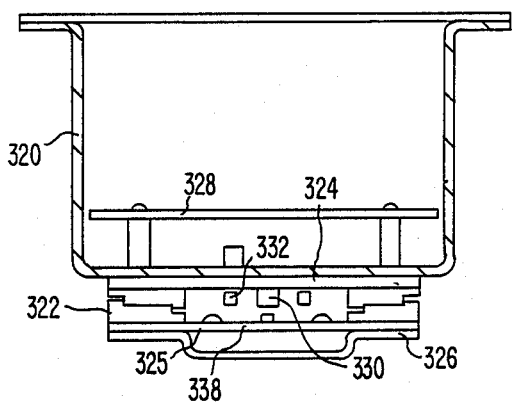
FIG. 15 is a top view, partially in section of the selector housing shown in FIG. 11.

The construction of the main selector housing 320 can best be described in connection with FIGS. 11, 15 and 16. FIG. 11 illustrates the housing 320 viewed from the opposite side of FIG. 12. FIG. 15 is a top view of the housing, partially in section, without the selector tape 300. As can be seen in FIG. 11, the tape 300 passes through three pairs of opposed guides 322, which are preferably plastic. The preferred construction of such guides is described further on. The main selector housing 320 includes, in addition to the guides, a main sensor board 324 (see FIG. 15) an auxiliary sensor board 325, an auxiliary sensor cover 326 and a microprocessor-containing printed circuit board 328. The sensor board 324 contains magnetic sensing elements for detecting the strip magnets 308 and 310. The auxiliary sensor board 325 contains magnetic sensor elements for detecting the bar magnets 330 when a hole in the tape is in alignment therewith. The processor board 328 is mounted inside of the housing 320. The housing 320 is preferably formed from a piece of sheet metal, in which the sides are bent up to form the sides of the housing 320. The forming of sheet metal ensures that the portion of the housing 320 that faces the tape will be very flat.

Figure 16:
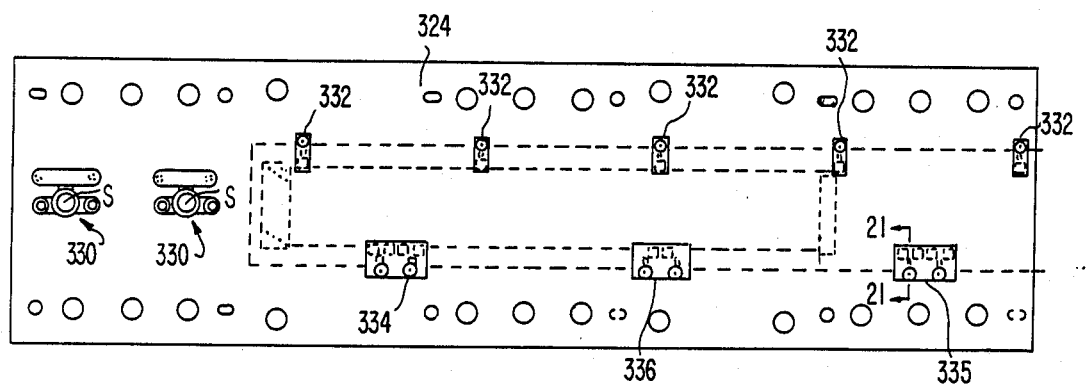
FIG. 16 is a front view of the sensor mounting board shown in FIG. 15.

FIG. 16, is a top view of the main sensor board 324 shown in FIG. 15. Preferably the board 324 is formed of a printed circuit board material, which inherently is flat and has excellent tolerances. It is important that the surface on which the detectors are mounted is extremely flat and in good alignment with the tape in order to obtain accurate reading. As shown in FIG. 16, the board 324 has a series of holes and slots therein for the purpose of mounting. Moreover, the board has a pair of cylindrical bar magnets 330 mounted thereon along the center line of the board and two series of magnetic sensor devices aligned vertically on either side of the vertical center line. In particular, one side of the board has five magnetic sensor devices, preferably hall effect transducers 332 that are vertically aligned relative to strip magnets 310 (FIG. 13). The board 324 also includes a pair of multiple hall effect sensors 334 and 335, which are vertically spaced from one another a distance slightly greater than the length of strip magnet 308 of FIG. 13. Finally, a pair of door zone hall effect sensor devices 336 are mounted at approximately a midway point of sensors 334 and 335.

The auxiliary sensor board 325 may be of similar construction to the board 324, i.e., should be relatively flat. A pair of hall effect sensors 338 (one of which is shown schematically in FIG. 15) are attached to board 325 opposite the magnets 330. Accordingly, as the selector housing 320 moves relative to the tape 300, the elongated holes 306 move between the magnets 330 and their corresponding sensors 338. Magnets 310 move past the corresponding set of magnetic sensors 332, and magnets 308 move past the corresponding magnetic sensors 334, 335 and 336.

Figure 14:
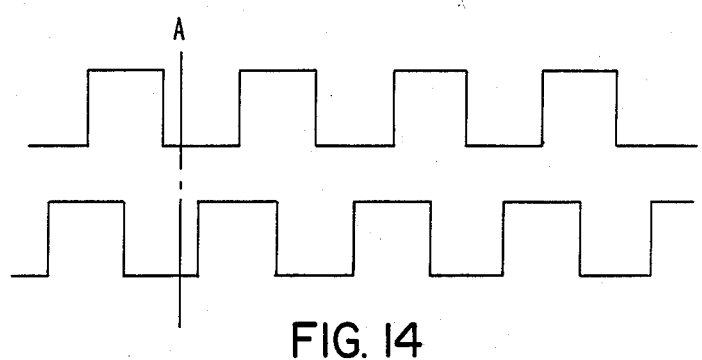
FIG. 14 illustrates the magnetic readouts of a pair of vertically spaced-apart magnetic sensors and positioned to detect the holes of a tape in accordance with FIG. 13.

In operation, the hall effect devices 338 on the auxiliary board 325 detect the magnets 330 when the holes are present and do not detect the magnets between the holes. The slots are preferably sized to produce a square wave output from each of the sensors, and preferably the sensors are spaced from one another so as to be 90 degrees out of phase, as shown in FIG. 14. These signals are sent to the selector, which counts the pulses to determine elevator travel distance. Moreover, as can be seen in FIG. 14 the microprocessor determines the direction of elevator travel from the sequence of the signals received. As shown in FIG. 14, during portions of the elevator travel the signal from both magnet sensors is zero, for example at position A. Thereafter, each signal will become positive, but in opposite sequence depending upon the direction of elevator travel. By determining the state of phase B on transition of phase A, the microprocessor can determine the direction of elevator travel. (Similarly, the door operator micro uses this same technique of quadrature to determine the direction of door motor rotation). The selector reads the binary floor position sensors whenever the car becomes level with a landing, i.e. when the door zone sensor is actuated and the LU and LD sensors are not.

Floor levelling can be illustrated by FIG. 16 which includes level up sensors 334 and level down sensors 335. If the car is exactly level with the floor, magnet 308 (FIG. 13) will be centrally positioned relative to sensors 334 and 335. Magnet 308 will however energize DZ sensor 336, which represents the door zone signal. This signal indicates that the elevator is at the landing and permits the doors to be opened. At such time as the elevator is not level with the floor, the magnet 308 will activate sensor 334 or 335, indicating that the car is too high or too low.

FIG. 16 shows four sensors for the level up and level down sensor units 334, 335. It is possible to provide an assembly having only a single sensor at such a point to provide the level up and level down signals. In the embodiment shown in FIG. 16, however, it is possible to select which sensors are to be used for signals. By changing the sensor connections, the size of the dead zone can be appropriately varied.

We claim:

1. An elevator system having a car with a door moveable between open and closed positions, a drive means for raising and lowering the car, a processor control means for actuating said drive means for moving the car between landings and for stopping the car at landings, and for issuing door open and door closed commands, and a door operator means comprising:
   a door drive means coupled to said door for opening and closing the door;
   position indicating means representative of door open limit DOL and door closed limit DCL;
   obstruction detecting means;
   sensor means for generating travel distance signals representative of distance of door travel; and
   microprocessor means coupled to said processor control means for controlling said door drive means including
   (a) means for generating speed control signals for controlling the speed of said door drive means;
   (b) programmable means for storing travel distance value between open and closed positions of the door;
   (c) programmable means for storing maximum door speed, travel-in speed, slowdown distance, and travel-in distance for both a door open cycle and a door closed cycle;
   (d) means responsive to a door open or close command from said processor control means for executing a door opening or closing cycle, wherein each cycle includes programmed command for:
(i) activating said door drive means up to said maximum door speed;
(ii) calculating instantaneous door position responsive to said stored travel distance and said travel distance signals;
(iii) slowing down said door drive means at a preselected rate responsive to reaching said slowdown distance;
(iv) operating said drive means at said travel-in speed responsive to reaching said travel in-distance;
(v) stopping said door upon detecting DOL or DCL; and
(vi) wherein said door closed cycle further includes an interrupt means responsive to said obstruction detecting means for stopping said drive means; and wherein said microprocessor means further includes a first interrupt cycle for re-opening the door responsive to said obstruction detecting means; a second interrupt cycle for stopping, but not fully re-opening the door, responsive to said obstruction detecting means, and a third interrupt cycle for overriding at least one obstruction detecting means and actuating said drive means for urging said door closed; and wherein said processor control means comprises means for selecting, in conjunction with issuing door closed commands, the first, second, or third interrupt cycle for closing the door.

2. An elevator system as claimed in claim 1, wherein said door drive means includes a motor and an H-bridge motor control having transistors activated in pairs for providing current, and wherein said microprocessor means has means to provide said speed control signals for actuating said transistors out of phase for doubling the effective switching frequency.

3. An elevator system as claimed in claim 1, wherein said control means includes timer means for setting door open times, and responsive to said obstruction detecting means and door re-opening, for setting a different door open time.

4. An elevator system as claimed in claim 1, wherein said microprocessor means includes a pulser microprocessor for issuing speed control signals, said pulser microprocessor including input/output terminals for receiving signals from said obstruction detecting means and DOL and DCL signals, and a control microprocessor for receiving door open and door close commands, sensor means for monitoring and correcting the speed of said drive means, means for instructing said pulser microprocessor to initiate door open and door closed cycles, and means for communicating with said processor control means.

5. An elevator system as claimed in claim 4, wherein said control microprocessor and pulser microprocessor each includes on-board, programmable memory for storing an operating program.

6. An elevator system as defined in claim 4, wherein said door drive means includes a motor, a motor control, and a control logic device for supplying signals to said motor control, wherein, said pulser microprocessor supplies said speed control signals to said control logic device, and wherein said control microprocessor includes means for monitoring said pulser microprocessor output and for controlling the output of said control logic device responsive thereto.

7. An elevator system as claimed in claim 1, wherein said door operator means includes a housing, and wherein the drive means includes a motor and a main drive pulley coupled to the motor, said pulley including a shaft supported by said housing and having a shaft extension disposed in the housing, a printed circuit board mounted in said housing and containing said microprocessor means, wherein said printed circuit board includes an edge adjacent said shaft extension, and wherein said shaft and edge contain cooperating elements of a means for detecting rotational position of said shaft at DOL and DCL positions.

8. An elevator system as claimed in claim 6, comprising a pair of sensor means for generating pulses representative of motor rpm, said pulses being out of phase, and means for determining motor direction responsive to signal comparison characteristics.

9. A elevator system having a car with a door moveable between open and closed positions, a drive means for raising and lowering the car, a processor control means for actuating said drive means for moving the car between landings and for stopping the car at landings, and for issuing door open and door closed commands, and a door operator means comprising:
a door drive means coupled to said door for opening and closing the door;
position indicating means representative of door open limit DOL and door closed limit DCL;
obstruction detecting means; sensor means for generating travel distance signals representative of distance of door travel;
microprocessor means for controlling said door drive means;
a serial communications link coupling said microprocessor means and said processor control means; and
at least one diagnostic terminal connector, for an external diagnostic/programming device, connected to said communications link;
wherein said microprocessor means comprises:
(a) means for generating speed control signals for controlling the speed of said door drive means;
(b) programmable means for storing travel distance value between open and closed positions of the door;
(c) programmable means for selectively receiving from said diagnostic terminal connector, and for storing, maximum door speed, travel-in speed, slowdown distance, and travel-in distance for both a door open cycle and a door closed cycle;
(d) means responsive to a door open or close command from said processor control means for executing a door opening or closing cycle, wherein each cycle includes programmed commands for:
(i) activating said door drive means up to said maximum speed;
(ii) calculating instantaneous door position responsive to said stored travel distance and said travel distance signals;
(iii) slowing down said drive means at a preselected rate responsible to reaching said slowdown distance;
(iv) operating said drive means at said travel-in speed responsive to reaching said travel in-distance;
(v) stopping said door upon detecting DOL or DCL; and
(vi) wherein said door closed cycle further includes an interrupt means responsive to said obstruction detecting means for stopping said drive means.

* * * * *